United States Patent [19]

Mukai et al.

[11] Patent Number: 5,130,855
[45] Date of Patent: Jul. 14, 1992

[54] VIEWFINDER OPTICAL SYSTEM

[75] Inventors: Hiromu Mukai; Ichiro Kasai, both of Osaka, Japan

[73] Assignee: Minolta Camera Kabushiki Kaisha, Osaka, Japan

[21] Appl. No.: 341,693

[22] Filed: Apr. 21, 1989

[30] Foreign Application Priority Data

Apr. 22, 1988 [JP] Japan ............................ 63-54774
Jun. 7, 1988 [JP] Japan ........................... 63-140757

[51] Int. Cl.$^5$ .......................... G02B 5/04; G03B 13/08
[52] U.S. Cl. ........................... 359/836; 359/403; 354/155; 354/224
[58] Field of Search ........................ 350/500-501, 350/527-528, 560, 569, 286, 287, 170-174; 354/155, 225, 408, 409, 75, 219

[56] References Cited

U.S. PATENT DOCUMENTS

| | | | |
|---|---|---|---|
| 3,620,147 | 11/1971 | Ataka et al. | 354/477 |
| 3,783,765 | 1/1974 | Ono et al. | 354/155 |
| 4,063,261 | 12/1977 | Kuboshima | 354/155 |
| 4,309,078 | 1/1982 | Hara et al. | 350/286 |
| 4,309,093 | 1/1982 | Kuwayawa et al. | 354/155 |
| 4,437,750 | 3/1984 | Ikari | 354/155 |
| 4,482,208 | 11/1984 | Pohle | 350/286 |
| 4,525,744 | 6/1985 | Nakamura et al. | 354/219 |
| 4,545,655 | 10/1985 | Fantone et al. | 354/225 |
| 4,673,262 | 6/1987 | Tsuji | 354/225 |
| 4,704,022 | 11/1987 | Nozawa et al. | 354/219 |
| 4,801,197 | 1/1989 | Minami | 350/574 |
| 4,855,837 | 8/1989 | Tanimoto | 354/75 |
| 4,957,356 | 9/1990 | Oizumi et al. | 354/225 |
| 5,024,514 | 6/1991 | Bleier et al. | 350/171 |

FOREIGN PATENT DOCUMENTS

| | | |
|---|---|---|
| 31846 | 10/1973 | Japan. |
| 59-125716 | 7/1984 | Japan. |
| 63-165632 | 10/1988 | Japan. |
| 63-165633 | 10/1988 | Japan. |
| 63-262635 | 10/1988 | Japan. |

OTHER PUBLICATIONS

Kyocera T-Scope "First Look"–Japanese Document, pp. 31-32, 2-page English translation (4 pages total), dated 1988.
Kyocera T-Scope (Japanese), (4 pages), dated 1988.
Kyocera T-Scope (Japanese) (4 pages), dated Jun. 1988.

Primary Examiner—Bruce Y. Arnold
Assistant Examiner—Thong Nguyen
Attorney, Agent, or Firm—Price, Gess & Ubell

[57] ABSTRACT

A viewfinder optical system including an objective lens for forming an image of a subject, a rooflike reflecting portion for reflecting an incident bundle of rays so as to deflect the incident bundle of rays through 90°, which is provided between the objective lens and the image of the subject formed by the objective lens, a double reflecting portion for twice reflecting a bundle of rays reflected by the rooflike reflecting portion so as to deflect the bundle of rays through 270° and an eyepiece for enlarging the image of the subject.

14 Claims, 6 Drawing Sheets

VIEWFINDER OPTICAL SYSTEM

BACKGROUND OF THE INVENTION

1. Field of the Invention

The present invention relates to a real image type viewfinder optical system in which an inverted image of a subject formed by an objective lens can be viewed as an erecting image.

Furthermore, the present invention relates to a real image type viewfinder optical system in which a viewfinder image can be observed both at eye level and at waist level.

2. Description of the Prior Art

Figure 1:
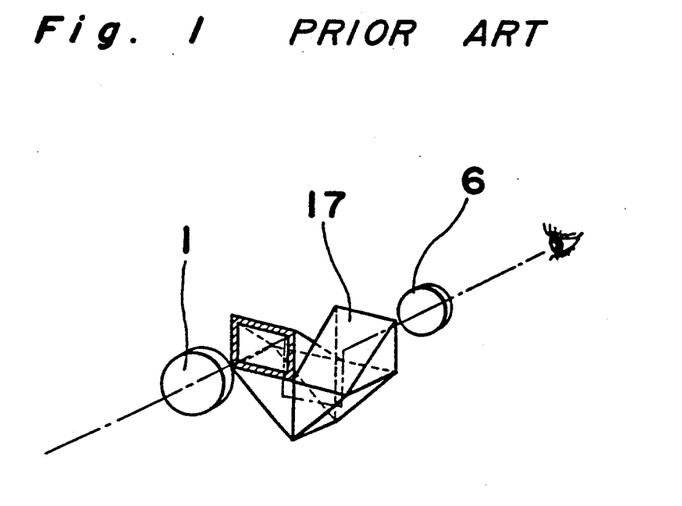
FIG. 1 is a schematic view of a prior art viewfinder optical system employing a Porro prism (already referred to)

Conventionally, in real image type viewfinder optical systems having an objective lens provided independently of a photo-taking lens, it has been so arranged that an inverted image of a subject is once formed by a positive objective lens such that an erecting viewfinder image is observed through an erecting optical system for inverting the inverted image of the subject vertically and horizontally. The known erecting optical systems can be roughly classified into two types, i.e. one employing a Porro prism or a Porro mirror as disclosed in U.S. Pat. No. 4,545,655 and the other in which an inverted image is re-formed as an erecting image by a relay lens system. The known real image type viewfinder optical system employing the relay lens has such a drawback that its relay optical system becomes excessively large in length and therefore, cannot be made compact in size. Meanwhile, as shown in FIG. 1, in the prior art viewfinder optical system employing a Porro prism 17 or the Porro mirror, a distance between an objective lens 1 and an eyepiece 6 becomes smaller than that of the type employing the relay lens but such a problem arises that a relatively large space is required to be provided vertically and horizontally for accommodating the Porro prism 17 or the Porro mirror according to shape of the Porro prism 17 or the Porro mirror.

Figure 2:
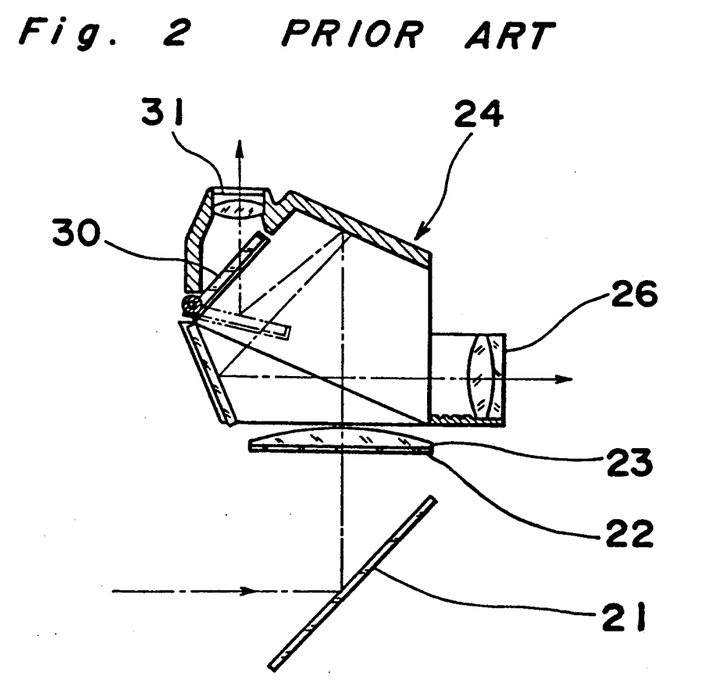
FIG. 2 is a sectional view of a prior art viewfinder optical system enabling changeover between eye level and waist level (already referred to)

Meanwhile, in the field of single-lens reflex cameras, a number of cameras have been proposed in which a viewfinder image can be observed both at eye level and at waist level. For example, as shown in FIG. 2, in a prior art viewfinder optical system disclosed in Japanese Patent Publication No. 31846/1973, a rooflike reflecting mirror 24 is employed in place of a pentagonal roof prism. The prior art viewfinder optical system further includes a plane reflecting mirror 21, a focusing screen 22, a condenser lens 23, an eyepiece 26 for eye level, a mirror 30 and an eyepiece 31 for waist level. At the time of eye level, the mirror 30 is retracted upwardly as shown by the solid lines so as to horizontally pass a bundle of rays through the eyepiece 26. On the other hand, at the time of waist level, a bundle of rays reflected from a roof face of the rooflike reflecting mirror 24 is vertically deflected by the mirror 30 disposed at the position shown by the imaginary lines so as to pass through the eyepiece 31. Therefore, the viewfinder image becomes an erecting image both at eye level and at waist level. At waist level, an enlarged image can be observed through the eyepiece 31.

However, in the above described arrangement of the prior art viewfinder optical system both for eye level and for waist level, since both the eyepiece 26 for eye level and the eyepiece 31 for waist level are disposed perpendicularly to the photo-taking lens (objective lens), a camera body incorporating this viewfinder optical system becomes large in height and thus, this viewfinder optical system cannot be used for a compact lens shutter camera.

SUMMARY OF THE INVENTION

Accordingly, an essential object of the present invention is to provide a novel viewfinder optical system of real image type which is made sufficiently compact in size.

Another important object of the present invention is to provide a novel viewfinder optical system in which a viewfinder image can be observed as an erecting image both at eye level and at waist level.

Still another object of the present invention is to make the latter viewfinder optical system sufficiently compact in size.

In order to accomplish these objects, a viewfinder optical system embodying the present invention comprises: an objective lens for forming an image of a subject; a rooflike reflecting portion for reflecting an incident bundle of rays so as to deflect the incident bundle of rays through 90°, which is provided between said objective lens and the image of the subject formed by said objective lens; a double reflecting portion for twice reflecting a bundle of rays reflected by said rooflike reflecting portion so as to deflect the bundle of rays through 270°; and an eyepiece for enlarging the image of the subject.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
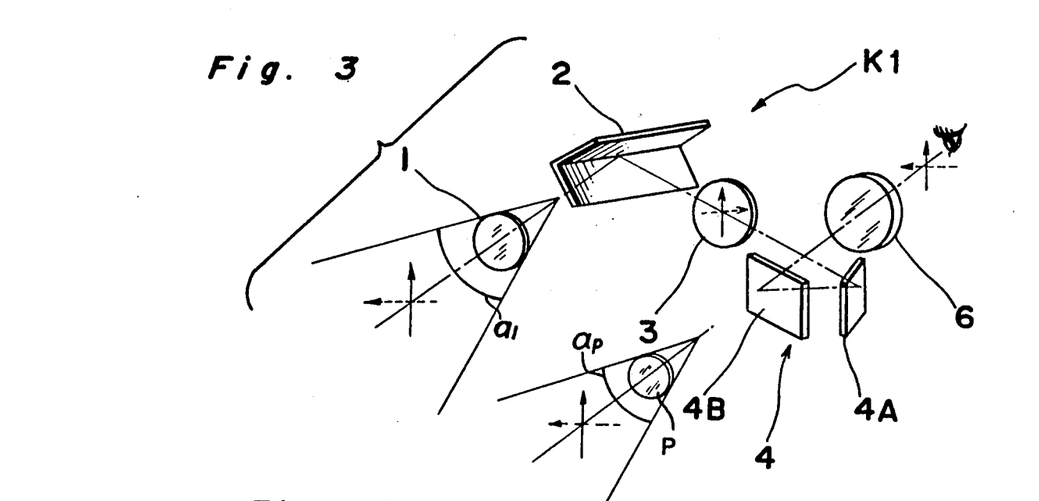
FIG. 3 is a schematic view of a viewfinder optical system according to a first embodiment of the present invention.

Referring now to the drawings, there is shown in FIG. 3, a viewfinder optical system K1 according to a first embodiment of the present invention. The viewfinder folded optical system K1 includes an objective lens 1 provided separately from a photo taking lens, a roof mirror 2 having two reflecting surfaces crossed at right angles to each other, a condenser lens 3 provided adjacent to a focal surface of the objective lens 1, two independent reflecting mirrors 4A and 4B having an angle of 45° with each other for effecting reflection twice and an eyepiece 6. Hereinafter, a device having two independent reflecting surfaces, for example the mirrors 4A and 4B, is referred to as a double reflecting device. A bundle of rays from a subject inverted vertically and horizontally by the objective lens 1 is not only inverted vertically or horizontally but deflected through 90° relative to its incident direction by the roof mirror 2. In the case where an edge of the roof of the roof mirror 2 is disposed horizontally as shown in FIG. 3, the bundle of rays is inverted vertically. On the other hand, in the case where the edge of the roof of the roof mirror 2 is disposed vertically, the bundle of rays is inverted horizontally. In the latter case, the bundle of rays from the objective lens is reflected vertically.

The bundle of rays deflected through 90° relative to its incident direction by the roof mirror 2 is initially subjected to image formation in the vicinity of the condenser lens 3. Then, at the double reflecting device 4, the bundle of rays is not only deflected through 270° relative to its incident direction but inverted horizontally or vertically so as to be returned to an erecting image. In order to prevent eclipse of the bundle of rays proceeding to an eye point, the condenser lens 3 should be placed in the vicinity of the focal surface of the objective lens 1.

Figure 4A:
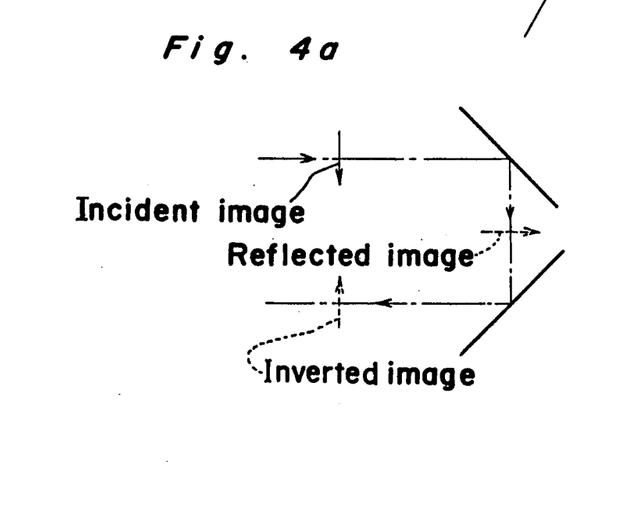
FIGS. 4a and 4b are views indicative of spaces occupied by two independent reflecting mirrors and a roof mirror employed in the viewfinder optical system of FIG. 3, respectively.
Figure 4B:
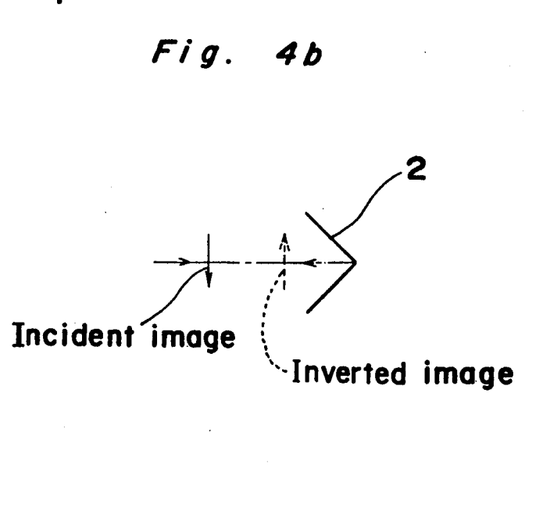

In the viewfinder optical system K1, since the roof mirror 2 is disposed rearwards of the objective lens 1, a space occupied by the viewfinder optical system K1 can be vertically or horizontally reduced to approximately a half of that of known viewfinder optical systems employing a Porro prism. The reason for a reduction in size thereof is described below. FIGS. 4a and 4b show spaces occupied by a double reflecting device, whose function concerning an angle of reflection is different from the double reflecting device 4 shown in FIG. 3 because of a difference of an angle between two reflecting mirrors, and the roof mirror 2 employed in the viewfinder optical system K1, respectively. In the roof mirror 2 of FIG. 4b, the incident image is inverted at a time by two mirrors having an angle of 90° with each other at the edge of the roof. On the other hand, in the double reflecting device of FIG. 4a, an inverted image is obtained by inverting the image at twice by means of the respective reflecting mirrors. Therefore, the roof mirror 2 is merely required to have a size approximately equal to that of the image. On the contrary, in the case of the double reflecting device, since each of the reflecting mirrors occupies a space as large as the image, a space occupied by the double reflecting device becomes about twice that of the roof mirror 2. Therefore, in the case where the edge of the roof of the roof mirror 2 is disposed horizontally as shown in FIG. 3, a vertical space occupied by the roof mirror 2 becomes about a half of that of the Porro prism or a Porro mirror. A vertical space occupied by the double reflecting device 4 is approximately identical with that of the roof mirror 2.

Supposing that character fo denotes a focal length of the objective lens 1 and character fe denotes a focal length of the eyepiece 6, a viewfinder magnification M is expressed by the following relation.

$$M = fo/fe$$

Figure 5:
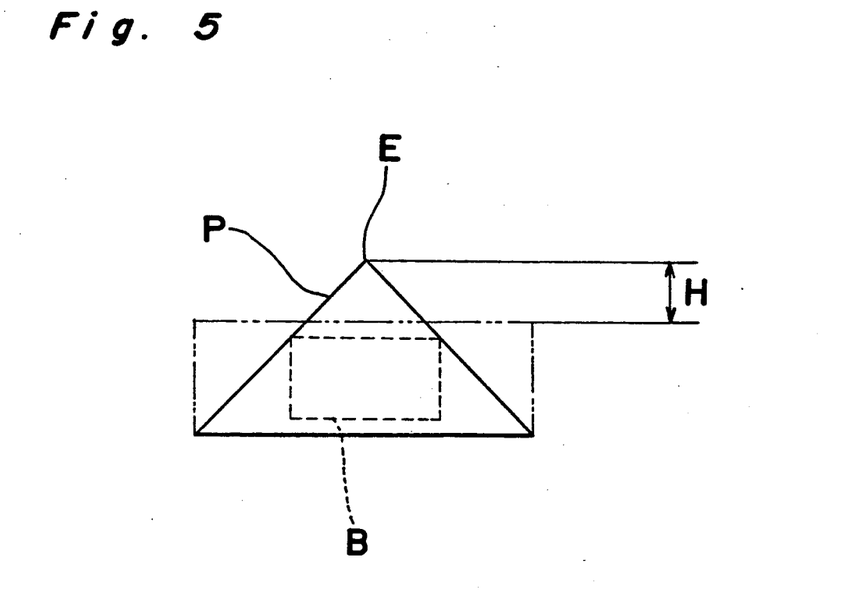
FIG. 5 is a view indicative of increase of optical path length in the case of employment of a pentagonal prism at a side of an eyepiece of the viewfinder optical system of FIG. 3.

Hence, if the optical path length at the side of the eyepiece 6 is increased, it becomes necessary to increase the focal length fe, thereby resulting in reduction of the viewfinder magnification M. In a TTL (through-the-lens) viewfinder in a single-lens reflex camera, a pentagonal roof prism P is employed in place of the double reflecting device 4 at the side of the eyepiece 6. As shown in FIG. 5, in order to prevent eclipse of a bundle B of rays passing through the viewfinder, an edge E of the roof of the pentagonal roof prism P is required to be raised in height, thereby resulting in an increase of an optical path length at the viewfinder. If the roof portion for inverting the bundle of rays in right and left directions is not disposed at the side of the eyepiece 6, the reflecting surfaces can be lowered through a distance H as shown by the imaginary lines in FIG. 5 so as to reduce the optical path length at the side of the eyepiece 6 accordingly, thus resulting in increase of the viewfinder magnification M. In the present invention, since the roof mirror 2 is disposed at the side of the objective lens 1, such a phenomenon is obviated that the optical path length at the side of the eyepiece 6 is increased more than a necessary level.

Figure 6:
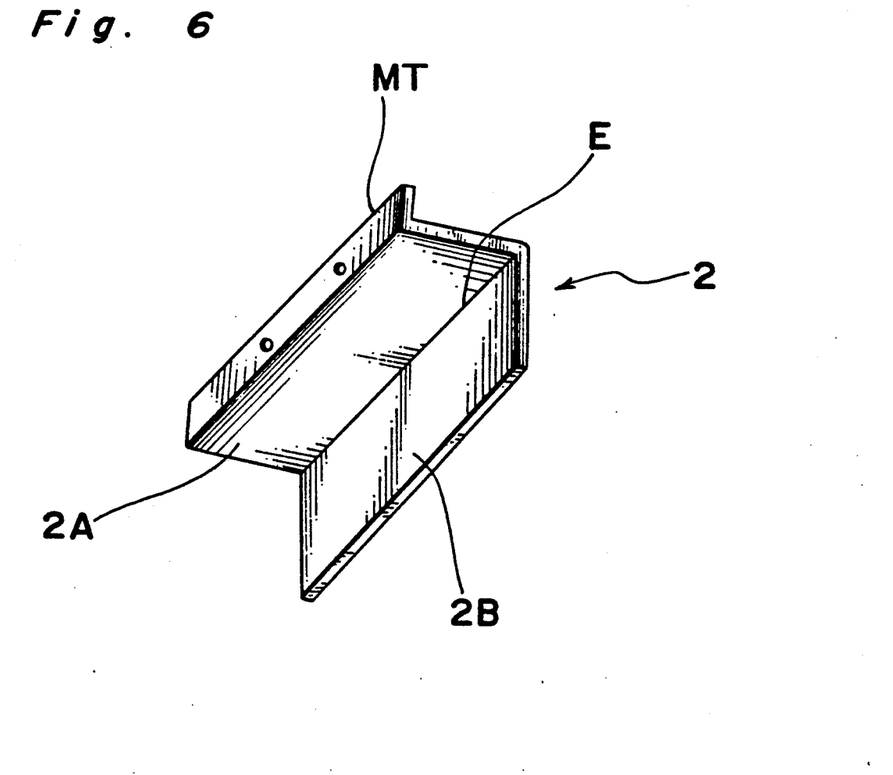
FIGS. 6 and 7 are perspective views showing examples of the roof mirror employed in the viewfinder optical system of FIG. 3, respectively.

Two mirrors of the roof mirror 2 are required to form an angle of 90° with each other quite accurately and the edge of the roof of the roof mirror 2 is required to be formed thin. If the edge of the roof of the roof mirror 2 is formed inaccurately, the formed image is distorted. FIG. 6 shows one example of the roof mirror 2. In the roof mirror 2 of FIG. 6, the roof portion is formed by resinous molding and aluminum or silver is deposited on reflecting surfaces 2A and 2B by means of vacuum evaporation. An angle formed by the reflecting surfaces 2A and 2B and accuracy of an edge E of the roof are substantially identical with those of a molding die. In FIG. 6, since the roof mirror 2 is a molded item, a mounting portion MT for mounting the roof mirror 2 on a camera can also be formed integrally with the reflecting surfaces 2A and 2B.

Figures 7, 8:
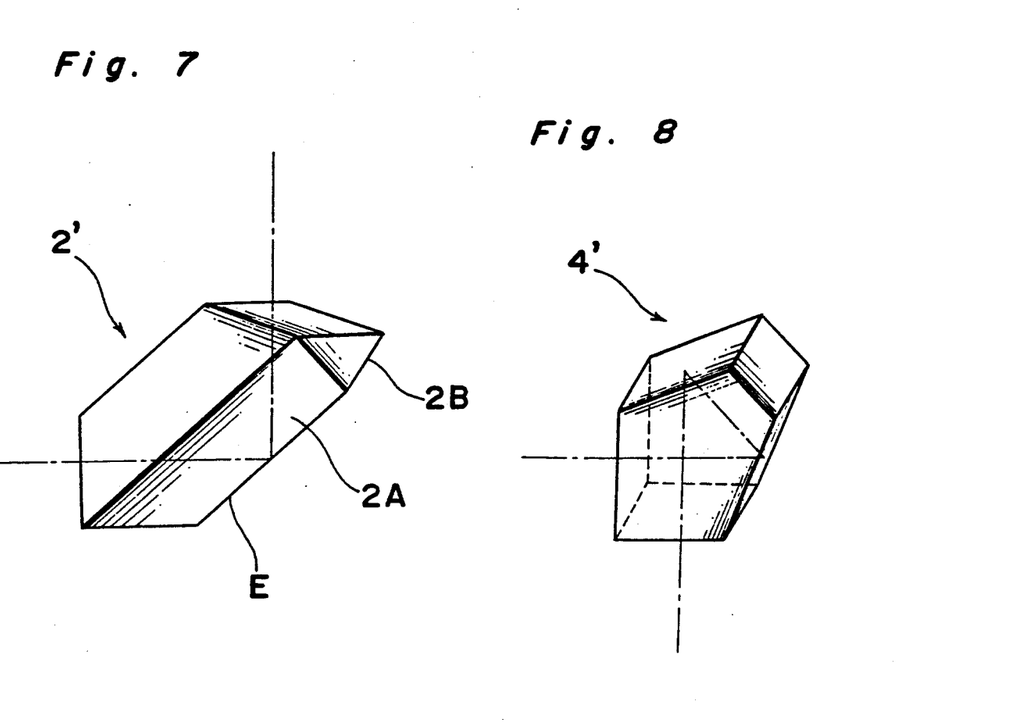
FIGS. 8 and 9 are perspective views showing examples of two independent reflecting mirrors employed in the viewfinder optical system of FIG. 3, respectively.

FIG. 7 shows a roof prism 2, which is another example of the roof mirror 2. Reflection on the rear face of the roof prism 2, can be achieved by total internal reflection or through vacuum evaporation of aluminum or silver thereon. The roof prism may be made of glass or formed by molding transparent resin. If the roof prism is made of glass, it becomes possible to obtain a remarkably accurate roof portion.

Meanwhile, a prism 4' shown in FIG. 8 can also be employed as the double reflecting device 4. The prism 4, may be made of glass or formed by molding transparent resin. In the prism 4', its optical path length can be substantially reduced in comparison with that at the reflecting mirrors 4A and 4B because a refractive index of glass is larger than that of air.

Figure 9:
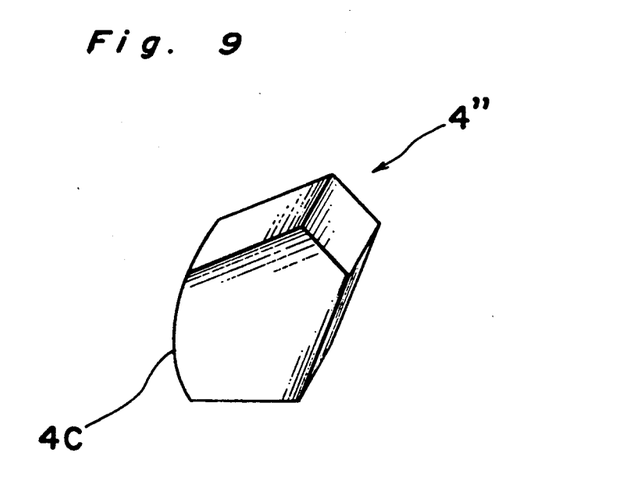

Furthermore, as shown in FIG. 9, a prism 4" having a condenser face 4C can also be employed as the double reflecting device 4. In the prism 4", since the prism 4" is formed integrally with the condenser lens 3, the number of the components of the viewfinder optical system K1 can be reduced, so that it becomes possible to obtain a compact viewfinder optical system in which positioning accuracy of the components is high.

As is seen from the foregoing, in the viewfinder optical system according to the first embodiment of the present invention, since the roof mirror is disposed immediate rearwards of the objective lens, the space occupied by the viewfinder optical system is vertically or horizontally reduced to approximately a half of that of the known viewfinder optical systems employing the Porro prism or the Porro mirror, so that the viewfinder optical system can be made compact in size and a relatively high viewfinder magnification can be achieved while providing an angle of view substantially identical with that of the photo-taking lens.

Figure 10:
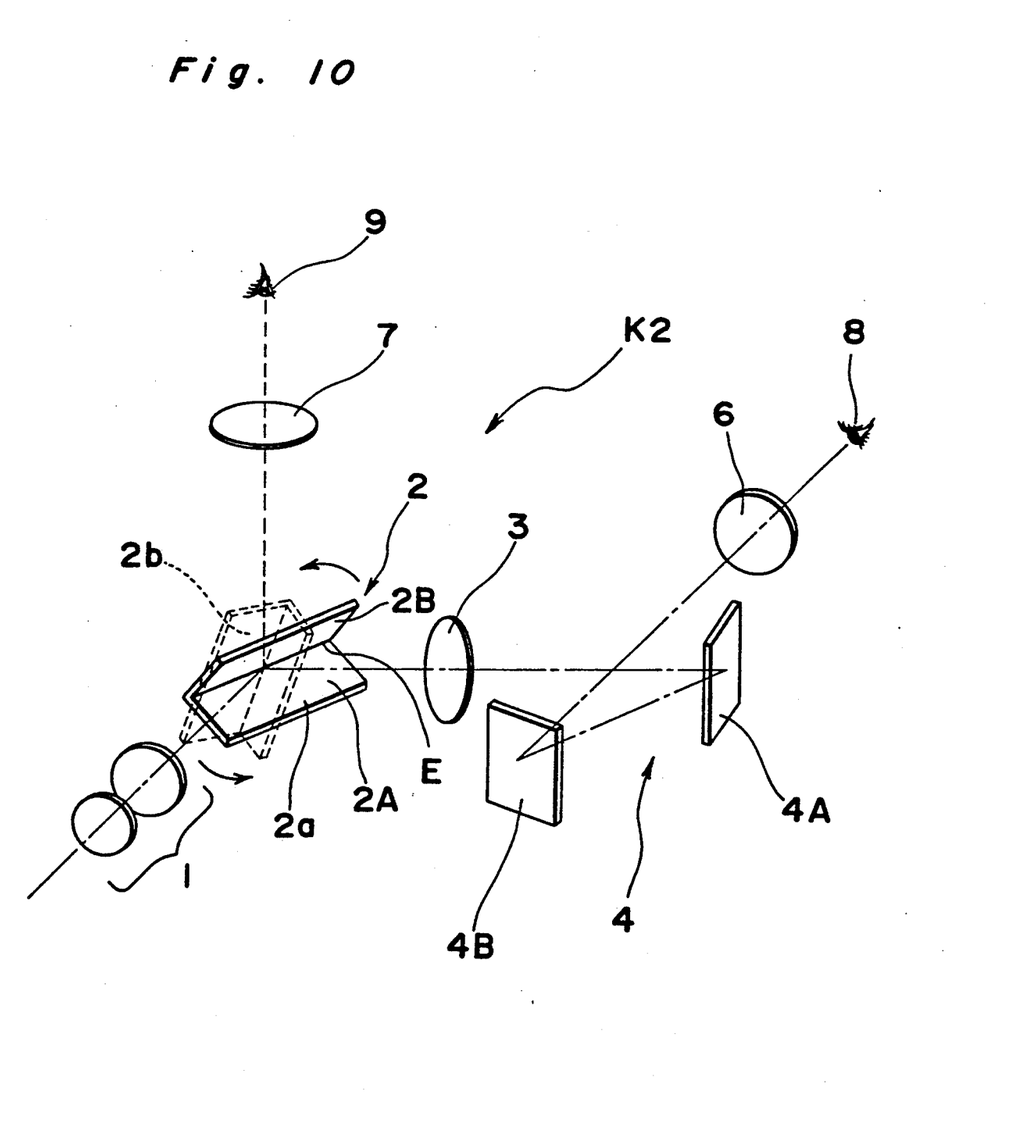
FIG. 10 is a schematic view of a viewfinder optical system according to a second embodiment of the present invention.

Hereinbelow, a viewfinder optical system K2 according to a second embodiment of the present invention is described with reference to FIG. 10. The roof mirror 2 is rotatably supported so as to be rotated about an optical axis of the objective lens 1.

In the viewfinder optical system K2, a changeover can be performed between an eye level 8 finder at which an image of a subject can be viewed along an axis in parallel with the optical axis of the objective lens 1 from a rear side of a camera body (not shown) and a waist level 9 finder at which the image of the subject can be observed perpendicularly to the optical axis of the objective lens 1 from above the camera body. Namely, in FIG. 10, when the roof mirror 2 is held at the position 2a shown by the solid lines, incident light is lead to the eye level 8. Meanwhile, when the roof mirror 2 is held at the position 2b shown by the broken lines, incident light is led to the waist level 9. The roof mirror 2 is held such that the edge E of the roof forms an angle of 45° with the optical axis of the objective lens 1. The roof mirror 2 is rotated such that the edge E of the roof is disposed by means of a rotation of the roof mirror, in a horizontal plane containing the optical axis of the objective lens 1 at the time of the eye level finder and in a vertical plane containing the optical axis of the objective lens 1, at the time of the waist level finder respectively. Since a mechanism for rotating the roof mirror 2 is not directly associated with the present invention, description thereof is abbreviated for the sake of brevity.

On the optical axis of the roof mirror 2 at the time of the eye level finder, the condenser lens 3 is disposed in the vicinity of the focal surface of the objective lens 1. The double reflecting device 4 constituted by the independent reflecting mirrors 4A and 4B is disposed rearwards of the condenser lens 3 such that the reflecting mirrors form an angle of 45° with each other. The double reflecting device 4 deflects the bundle of rays through 270° relative to its incident direction so as to lead the viewfinder image to the eye level 8. Thus, since the image of the subject inverted vertically and horizontally by the objective lens 1 is inverted vertically by the roof mirror 2 disposed at the position 2a and is further inverted horizontally by the double reflecting device 4, the image of the subject is returned to an erecting image so as to be enlarged by the eyepiece 6.

Meanwhile, since a refracting power of the condenser lens 3 is determined such that an eye point at the time of the eye level 8 coincides with aperture of the objective lens 1, eclipse of bundle of rays forming marginal portion of the image of the subject is not brought about.

On the optical axis of the roof mirror 2 at the time of the waist level 9, a condenser lens 7 is disposed in the vicinity of the focal surface or plane of the objective lens 1. For waist level viewing, the viewfinder image is viewed by spacing the photographer's eyes from the camera body so as to perform framing of the subject. Therefore, position of an eye point at the time of the waist level 9 is spaced further away from the camera body than that at the time of the eye level 8. Accordingly, the refracting power of the condenser lens 7 is made smaller than that of the condenser lens 3 such that the eye point at the time of the waist level 9 and the aperture of the objective lens 1 are set in a conjugate state relative to the focal plane. When used for viewing at the waist level 9, the image of the subject inverted vertically and horizontally by the objective lens 1 is merely inverted horizontally by the roof mirror 2 disposed at the position 2b. However, because the image of the subject deflected upwardly through 90° relative to the optical axis of the objective lens 1 is viewed from above, the image of the subject can be observed as an erecting image. Meanwhile, a Fresnel lens can be employed as the condenser lenses 3 and 7 so as to permit the use of thin condenser lenses 3 and 7.

Figure 11:
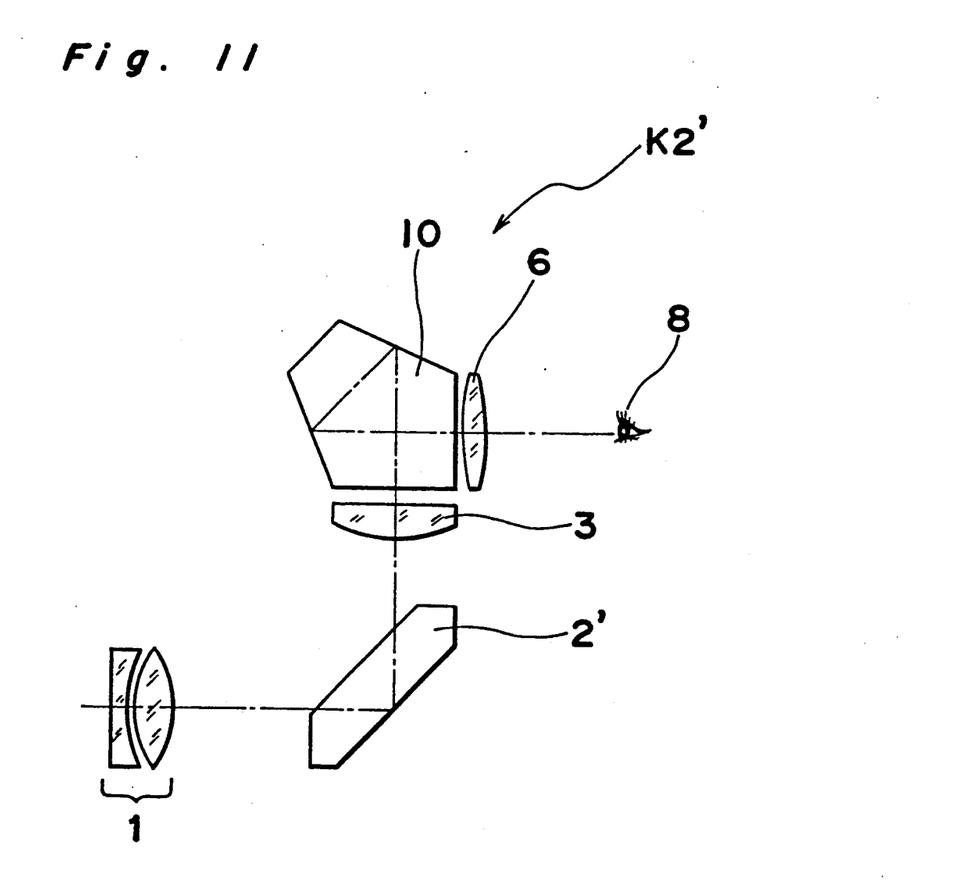
FIG. 11 is a schematic view showing a modification of the viewfinder optical system of FIG. 10.

Referring to FIG. 11, there is shown a viewfinder optical system K2' which is a modification of the viewfinder optical system K2. It should be noted that the plane perpendicular to the sheet of FIG. 11 is the vertical plane. In the viewfinder optical system K2', a roof prism 2' made of glass or resin is employed in place of the roof mirror 2 such that reflection on a rear face of the roof prism 2, is performed. Furthermore, a pentagonal prism 10 made of glass or resin is employed as the double reflecting device 4 constituted by the reflecting mirrors 4A and 4B. Since other constructions of the viewfinder optical system K2' are similar to those of the viewfinder optical system K2, description thereof is abbreviated for the sake of brevity. FIG. 11 shows the viewfinder optical system K2, held at the eye level 8. At the time of the waist level 9, the roof prism 2' is rotated through 90° about the optical axis of the objective lens 1 so as to reflect the viewfinder image perpendicularly to the sheet of FIG. 11. At the time of the waist level 9, a condenser lens (not shown) is provided in the vicinity of the focal surface of the objective lens 1 in the same manner as in the viewfinder optical system K2.

By employing the roof prism 2', an optical path length can be reduced in comparison with that of the roof mirror 2 and thus, it becomes possible to use the objective lens 1 having a short lens back. Meanwhile, in order to obtain an image free from distortion, the angle of the roof should be set at 90° quite accurately and the edge of the roof should be quite thin. In this connection, since the roof prism 2' made of glass is employed, the edge of the roof prism 2' can be formed extremely accurately.

Furthermore, by employing the pentagonal prism 10, an optical path length is reduced in comparison with that of the two independent reflecting mirrors 4A and 4B, so that the focal length of the eyepiece 6 can be decreased and thus, it becomes possible to increase magnification at the time of the eye level 8. Meanwhile, it can also be so arranged that the pentagonal prism 10 is formed integrally with the condenser lens 3 by using resin.

As is clear from the foregoing description, in the viewfinder optical system according to the second embodiment of the present invention, the rooflike reflecting portion such as the roof mirror or the roof prism disposed immediate rearwards of the objective lens is rotated about the optical axis of the objective lens such that the viewfinder image at the eye level and the viewfinder image at the waist level can be obtained. Furthermore, at the eye level, the double reflecting device is further provided, so that both the viewfinder image at the eye level and the viewfinder image at the waist level can be obtained as an erecting image.

Meanwhile, at the time of the eye level, since incident light is deflected horizontally, the camera body is not made large in the longitudinal direction.

Furthermore, since the identical objective lens is used at the eye level and the waist level, magnification of the viewfinder image at the eye level and the viewfinder image at the waist level can be easily changed by merely changing magnification of the objective lens.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A viewfinder optical system comprising:
   an objective lens which is provided separately from a photo-taking lens having an angle of view, the objective lens directly receiving an incident bundle of rays from a subject and having an angle of view identical with the angle of view of said photo-taking lens;
   a rooflike reflecting means which is provided between said objective lens and a focal plane of said objective lens, said rooflike reflecting means including two surfaces bounded by an edge disposed horizontally such that said two surfaces form an angle of 90 degrees at said edge and said rooflike reflecting means inverting the incident bundle of rays from said objective lens laterally and symmetrically with respect to said edge and deflecting the incident bundle of rays through approximately 90 degrees relative to an incident direction of the incident bundle of rays;
   a double reflecting means for deflecting the bundle of rays from said rooflike reflecting means through approximately 270 degrees relative to the direction of the deflected bundle of rays, said double reflecting means including two planar reflecting surfaces; and
   an eyepiece for enlarging an image of the subject emitted from said double reflecting means, said double reflecting means being provided between the focal plane of said objective lens and said eyepiece, wherein an optical axis of said objective lens is parallel to an exit optical axis of said eyepiece.

2. A viewfinder optical system as claimed in claim 1, further comprising:
   a condenser lens which is provided in the vicinity of the focal plane of said objective lens.

3. A viewfinder optical system as claimed in claim 2, wherein said rooflike reflecting means includes a roof prism such that the incident bundle of rays is reflected on rear faces of said roof prism.

4. A viewfinder optical system as claimed in claim 1, wherein said rooflike reflecting means includes a roof mirror.

5. A viewfinder optical system as claimed in claim 1, wherein said double reflecting means includes a prism such that the bundle of rays is reflected on rear faces of said prism.

6. A viewfinder optical system as claimed in claim 1, wherein said double reflecting means includes a prism whose surface nearby an image of the subject formed by said objective lens is provided with a condenser face.

7. A viewfinder optical system comprising:
   an objective lens which is provided separately from a photo-taking lens having an angle of view, the objective lens directly receiving an incident bundle of rays from a subject and having an angle of view identical with the angle of view of said photo-taking lens;
   a rooflike reflecting means which is provided between said objective lens and a focal plane of said objective lens, said rooflike reflecting means including two surfaces bounded by an edge such that said two surfaces form an angle of 90 degrees at said edge and said rooflike reflecting means having a first state in which said edge is disposed in a horizontal plane containing an optical axis of said objective lens and a second state in which said edge is disposed in a vertical plane containing the optical axis of said objective lens;
   a double reflecting means for twice deflecting the incident bundle of rays from said rooflike reflecting means including two planar reflecting surfaces; and
   an eyepiece for enlarging an image of the subject emitted from said double reflecting means, said double reflecting means being provided between said eyepiece and the focal plane of said objective lens in the first state of said rooflike reflecting means.

8. A viewfinder optical system as claimed in claim 8, further comprising:
   a first condenser lens having a refractive power, which first condenser lens is provided in the vicinity of the focal plane formed in the first state by said objective lens.

9. A viewfinder optical system as claimed in claim 8, further comprising:
   a second condenser lens having a refractive power, which second condenser lens is provided in the vicinity of the focal plane of said objective lens in a second state where said edge of said rooflike reflecting means is disposed in the vertical plane containing the optical axis.

10. A viewfinder optical system as claimed in claim 9, wherein the refractive power of said first condenser lens is larger than the refractive power of said second condenser lens.

11. A viewfinder optical system as claimed in claim 10, wherein said rooflike reflecting means includes a roof prism such that the incident bundle of rays is reflected on a rear face of said roof prism.

12. A viewfinder optical system as claimed in claim 7, wherein said rooflike reflecting means includes a roof mirror.

13. A viewfinder optical system as claimed in claim 7, wherein said double reflecting means includes a prism such that the bundle of rays is reflected on a rear face of said prism.

14. A viewfinder optical system comprising:
    an eye level viewfinder optical system including an objective lens, a double reflecting means, and an eyepiece for observing an image of a subject from said double reflecting means, said objective lens being provided separately from a photo-taking lens having an angle of view, the objective lens directly receiving an incident bundle of rays from the subject and having an angle of view identical with an angle of view of said photo-taking lens;

a waist level viewfinder optical system including said objective lens acting as an objective lens of said waist level viewfinder optical system and a condenser lens; and a rooflike reflecting means which is provided between said objective lens and a focal plane of said objective lens, including two surfaces bounded by an edge such that said two surfaces form an angle of 90 degrees at said edge, said rooflike reflecting means having a first state in which said edge is disposed in a horizontal plane containing an optical axis of said objective lens and a second state in which said edge is disposed in a vertical plane containing the optical axis of said objective lens, said double reflecting means twice deflecting the incident bundle of rays from said rooflike reflecting means and having two planar reflecting surfaces, said double reflecting means being provided between said eyepiece and the focal surface of said objective lens in the first state of said rooflike reflecting means, wherein, when said rooflike reflecting means is in the first state, said eye level viewfinder optical system can be used, and wherein, when said rooflike reflecting means is in the second state, said waist level viewfinder optical system can be used.

* * * * *